United States Patent
Raux et al.

(10) Patent No.: US 9,127,950 B2
(45) Date of Patent: Sep. 8, 2015

(54) LANDMARK-BASED LOCATION BELIEF TRACKING FOR VOICE-CONTROLLED NAVIGATION SYSTEM

(71) Applicants: Antoine Raux, Cupertino, CA (US); Rakesh Gupta, Mountain View, CA (US); Deepak Ramachandran, Mountain View, CA (US); Yi Ma, Columbus, OH (US)

(72) Inventors: Antoine Raux, Cupertino, CA (US); Rakesh Gupta, Mountain View, CA (US); Deepak Ramachandran, Mountain View, CA (US); Yi Ma, Columbus, OH (US)

(73) Assignee: Honda Motor Co., Ltd., Tokyo (JP)

( * ) Notice: Subject to any disclaimer, the term of this patent is extended or adjusted under 35 U.S.C. 154(b) by 291 days.

(21) Appl. No.: 13/801,441

(22) Filed: Mar. 13, 2013

(65) Prior Publication Data

US 2013/0297321 A1 Nov. 7, 2013

Related U.S. Application Data

(60) Provisional application No. 61/642,335, filed on May 3, 2012.

(51) Int. Cl.
*G01C 21/26* (2006.01)
*G01C 21/36* (2006.01)

(52) U.S. Cl.
CPC ............ *G01C 21/26* (2013.01); *G01C 21/3608* (2013.01); *G01C 21/3644* (2013.01)

(58) Field of Classification Search
CPC ....................................................... G01C 21/26
See application file for complete search history.

(56) References Cited

U.S. PATENT DOCUMENTS

| | | | |
|---|---|---|---|
| 5,961,571 A | 10/1999 | Gorr et al. | |
| 6,081,782 A | 6/2000 | Rabin | |
| 6,144,318 A | 11/2000 | Hayashi et al. | |
| 6,311,159 B1 | 10/2001 | Van Tichelen et al. | |
| 6,321,158 B1 | 11/2001 | DeLorme et al. | |

(Continued)

OTHER PUBLICATIONS

Allauzen, C., et al., "Openfst: A general and efficient weighted finite-state transducer library," In Proceedings of the Ninth International Conference on Implementation and Application of Automata (CIAA) Lecture Notes in Computer Science, 2007, LNCS 4783, vol. 4783, pp. 11-23. Springer.

(Continued)

*Primary Examiner* — Qian Yang
(74) *Attorney, Agent, or Firm* — Fenwick & West LLP (57) ABSTRACT

An utterance is received from a user specifying a location attribute and a landmark. A set of candidate locations is identified based on the specified location attribute, and a confidence score can be determined for each candidate location. A set of landmarks is identified based on the specified landmark, and confidence scores can be determined for the landmarks. An associated kernel model is generated for each landmark. Each kernel model is centered at the location of the associated landmark on a map, and the amplitude of the kernel model can be based on landmark attributes, landmark confidence scores, characteristics of the user, and the like. The candidate locations are ranked based on the amplitudes of overlapping kernel models at the candidate locations, and can also be ranked based on confidence scores associated with the candidate locations. A candidate location is selected and presented to the user based on the candidate location ranking.

28 Claims, 5 Drawing Sheets

(56) References Cited

U.S. PATENT DOCUMENTS

| | | | |
|---|---|---|---|
| 6,675,159 | B1 | 1/2004 | Lin et al. |
| 6,742,021 | B1 | 5/2004 | Halverson et al. |
| 6,799,201 | B1 | 9/2004 | Lee et al. |
| 7,027,974 | B1 | 4/2006 | Busch et al. |
| 7,225,183 | B2 | 5/2007 | Gardner |
| 7,233,862 | B2 | 6/2007 | Endo et al. |
| 7,243,085 | B2 | 7/2007 | Hatta |
| 2002/0087314 | A1 | 7/2002 | Fischer et al. |
| 2002/0173960 | A1 | 11/2002 | Ross et al. |
| 2005/0043940 | A1 | 2/2005 | Elder |
| 2007/0257792 | A1 | 11/2007 | Gold |
| 2008/0125968 | A1 | 5/2008 | Bradicich et al. |
| 2008/0262717 | A1 | 10/2008 | Ettinger |
| 2009/0030683 | A1 | 1/2009 | Williams |
| 2009/0030692 | A1 | 1/2009 | Deligne et al. |
| 2009/0070103 | A1 | 3/2009 | Beggelman et al. |
| 2009/0112598 | A1 | 4/2009 | Williams |
| 2009/0192800 | A1 | 7/2009 | Brandt |
| 2010/0057762 | A1 | 3/2010 | Hatami-Hanza |
| 2010/0138215 | A1 | 6/2010 | Williams |
| 2011/0282879 | A1 | 11/2011 | Bargeron et al. |
| 2011/0306355 | A1* | 12/2011 | Wigren et al. ............ 455/456.1 |
| 2012/0053945 | A1 | 3/2012 | Gupta et al. |
| 2012/0101809 | A1 | 4/2012 | Kennewick et al. |

OTHER PUBLICATIONS

Cohen, W.W., et al., "A comparison of string distance metrics for name matching tasks," In Proceedings of the IJCAI—2003 Workshop on Information Integration on the Web (IIWeb-03), 2003, pp. 73-78.

Fernandez, F., et al., "Speech Interface for controlling an Hi-fi Audio System Based on a Bayesian Belief Networks Approach for Dialog Modeling," Eurospeech, 2005, pp. 3421-3424, Lisboa, Portugal.

Huang, A., et al., "Natural language command of an autonomous micro-air vehicle," In International Conference on Intelligent Robots and Systems (IROS), Oct. 18-22, 2010, pp. 2663-2669.

Geomidpoint, "Google Maps Search Tips," 2 pages [online] [retrieved on Dec. 5, 2011] Retrieved from the internet <URL:http://www.geomidpoint.com/meet/searching.html>.

Google, "Google Maps Navigation (Beta)," 2011, 3 pages [online] [retrieved on Dec. 5, 2011] Retrieved from the internet <URL:http://www/google.com/mobile/navigation/>.

Gruenstein, A., et al., "Releasing a multimodal dialogue system into the wild: User support mechanisms," In Proceedings of the 8th SIGdial Workshop on Discourse and Dialogue, Sep. 2007, pp. 111-119.

Gruenstein, A., et al., "Scalable and Portable Web-Based Multimodal Dialogue Interaction with Geographical Databases," ICSLP-Interspeech, Sep. 17-21, 2006, pp. 453-456.

Gruenstein, A., et al., "The WAMI toolkit for developing, deploying, and evaluating web accessible multimodal interfaces," In Proceedings of the 10th international conference on Multimodal interfaces, Oct. 20-22, 2008, pp. 141-148. ACM.

MacMahon, M., et al., "Walk the talk: Connecting language, knowledge, and action in route instructions," In Proceedings of the National Conference on Artificial Intelligence, Jul. 2006, vol. 21, p. 1475-1482. Menlo Park, CA; Cambridge, MA; London; AAAI Press; MIT Press.

Mehta, N., et al., "Probabilistic ontology trees for belief tracking in dialog systems," In Proceedings of the 11th Annual Meeting of the Special Interest Group on Discourse and Dialogue, Sep. 24-25, 2010, pp. 37-46, Association for Computational Linguistics.

Michon, P.E., "When and why are visual landmarks used in giving directions?" in D. R. Montello, editor, Spatial Information Theory, 2001, vol. 2205 of Lecture Notes in Computer Science, pp. 292-305. Springer, Berlin.

PCT International Search Report for Written Opinion for PCT/US2013/039121, Oct. 18, 2013, 11 Pages.

PCT International Search Report and Written Opinion, for PCT/US2011/049758, Jan. 18, 2012, 9 pages.

Raux, A., et al., "Efficient probabilistic tracking of user goal and dialog history for spoken dialog systems," In Proceedings of Interspeech 2011, 4 Pages.

Seltzer, M., et al., "Robust location understanding in spoken dialog systems using intersections," In Proceedings of Interspeech, 2007, pp. 2813-2816.

Suzuki, K., et al., "Cultural differences of spatial descriptions in tourist guidebooks," Spatial Cognition IV. Reasoning, Action, and Interaction, 2005, LNAI 3343, pp. 147-164.

Tashev, I., et al., "Commute UX: Telephone Dialog System for Location-based Services," Proceedings of the $8^{th}$ SIGdial Workshop on Discourse and Dialogue, Sep. 2007, pp. 87-94, Association for Computational Linguistics.

Thomson, B., et al., "Bayesian update of dialogue state: A POMDP framework for spoken dialogue systems," Computer Speech & Language, 2009, pp. 562-588, vol. 24, No. 4.

Tom, A., et al., "Referring to landmark or street information in route directions: What difference does it make?" Spatial Information Theory, Foundations of Geoghraphic Information Science, Lecture Notes in Computer Science, 2003, vol. 2825, pp. 362-374.

Tversky, B., et al., "Pictorial and verbal tools for conveying routes," In Proceedings of the International Conference on Spatial Information Theory: Cognitive and Computational Foundations of Geographic Information Science (COSIT), 1999, pp. 51-64, LNCS 1661, Springer-Verlag London.

Amari, S. "Natural Gradient Works Efficiently in Learning," *Neural Computation*, 1998, pp. 251-276, vol. 10, No. 2.

Araki, M. "OWL-based Frame Descriptions for Spoken Dialog Systems," *International Workshop on Semantic Web Foundations and Application Technologies*, 2003, 3 pages.

Bonus, D. et al., "A 'K Hypotheses + Other' Belief Updating Model," *AAAI Workshop on Statistical and Empirical Approaches to Spoken Dialogue Systems*, 2006, 6 pages.

Bonus, D. et al., "The RavenClaw Dialog Management Framework: Architecture and Systems," *Computer Speech and Language, Computer Speech and Language*, 2009, pp. 332-361, vol. 23.

Goyal, P. et al., "Application of Bayesian Framework in Natural Language Understanding," *IETE Technical Review*, 2008, pp. 251-269, vol. 25, Issue 5. [Online] [Retrieved Nov. 1, 2010] Retrieved from the Internet <URL:http://tr.ietejournals.org/printarticle.asp?issn=0256-4602;year=2008;volume=25;issue=5;spage=251;epage=269;aulast=Goyal;type=0.>.

Helsper, E. et al., "Building Bayesian Networks through Ontologies," *European Conference on Artificial Intelligence*, 2002, 5 pages.

Horvitz, E. et al., "Harnessing Models of Users' Goals to Mediate Clarification Dialog in Spoken Language Systems," *International Conference on User Modeling*, 2001, 11 Pages.

Kim, K-M. et al., "A Semantic Bayesian Network Approach to Retrieving Information with Intelligent Conversational Agents," *Information Processing and Management*, 2007, pp. 225-236, vol. 43.

Koller, D. et al., "Object-Oriented Bayesian Networks," *Proceedings of the Thirteenth Annual Conference on Uncertainty in Artificial Intelligence*, Aug. 1-3, 1997, pp. 302-313, Providence, Rhode Island, USA.

Koller, D. et al., "P-Classic: A Tractable Probabilistic Description Logic," *Proceedings of the Fourteenth National Conference on Artificial Intelligence (AAAI-97)*, Aug. 1997, pp. 390-397, Providence, Rhode Island, USA.

Koller, D. et al., "Probabilistic Graphical Modesl: Principles and Techniques," 2009, pp. 345-375, 391-448, 562-576 and 1083-1124, MIT Press, Cambridge, Massachusetts, USA.

Melichar, M., "Design of Multimodal Dialogue-based Systems," Thesis, École Polytechnique Fédérale De Lausanne, 2008, 158 pages.

Noh, H. et al., "Ontology-based Inference for Information-Seeking in Natural Language Dialog Systems," *IEEE International Conference on Industrial Informatics*, 2008, pp. 1469-1474, Daejeon, Korea.

(56) References Cited

OTHER PUBLICATIONS

Paek, T. et al., Conversation as Action under Uncertainty, *Proceedings of the Sixteenth Annual Conference on Uncertainty in Artificial Intelligence,* 2000, pp. 455-464.

Papineni, K. et al., "Free-flow Dialogue Management Using Forms," *6th European Conference on Speech Communication and Technology: EUROSPEECH '99,* Sep. 5-9, 1999, pp. 1411-1414, Budapest, Hungary.

Park, H. et al., "Supporting Mixed Initiative Human-Robot Interaction: a Script-based Cognitive Architecture Approach," *2008 International Joint Conference on Neural Networks,* 2008, pp. 4107-4113.

Peters, J. et al., "Natural Actor-Critic," *Neurocomputing,* 2008, pp. 1180-1190, vol. 71.

Pfeffer, A. et al., "SPOOK: A System for Probabilistic Object-oriented Knowledge Representation," *Proceedings of the Fifteenth Annual Conference on Uncertainty in Artificial Intelligence (UAI),* 1999, pp. 541-550, Stockholm, Sweden.

sourceforge.net, "Project PNL Summary," Intel, 2005, 2 pages. [Online] [Retrieved Dec. 13, 2011] Retrieved from the Internet <URL:http://web.archive.org/web/20050221080654/http://sourceforge.net/projects/openpnl.>.

Van Zanten, G.E., "Adaptive Mixed-Initiative Dialogue Management," *IEEE Workshop on Interactive Voice Technology for Telecommunications Applications,* 1998, 8 pages.

Williams, J., "Partially Observable Markov Decision Processes for Spoken Dialog Management," Apr. 2006, Dissertation for Degree in Doctor of Philosophy, Cambridge University Engineering Department, one hundred 38 pages.

Williams, J., "Using Particle Filters to Track Dialogue State," *IEEE Workshop on Automatic Speech Recognition and Understanding,* 2007, 6 pages.

Young, S. et al., "The Hidden Information State Model: A Practical Framework for POMDP-based Spoken Dialog Management," *Computer Speech and Language,* 2009, pp. 150-174, vol. 24.

\* cited by examiner

LANDMARK-BASED LOCATION BELIEF TRACKING FOR VOICE-CONTROLLED NAVIGATION SYSTEM

RELATED APPLICATIONS

This application claims the benefit of U.S. Provisional Application No. 61/642,335, filed May 3, 2012, the content of which is incorporated by reference herein in its entirety.

FIELD OF THE INVENTION

The exemplary embodiments relate to the field of human-machine dialog systems and more particularly to the implementation of landmark-based location belief tracking in a voice-controlled navigation system.

BACKGROUND OF THE INVENTION

Mobile devices, such as smart phones and in-car computer systems, have generated demand for improved location-based services, such as location-based search, turn-by-turn navigation, access to business reviews, social event recommendations, and the like. Safety regulations may require the hands-free operation of a device providing such location-based services, for instance while a user is operating a vehicle. Accessing location-based services in a timely manner through speech and dialog alone is important to provide a smooth user-experience with devices providing such services.

When interacting with a dialog system's location-based services, a user will often need to identify a particular destination, such as a restaurant, store, or other public place. For instance, a vehicle navigation system requires a user to identify a destination location prior to providing directions to the destination location. While postal addresses can be used to unambiguously identify many locations, they are often either unknown or difficult for a user to access while, for instance, operating a vehicle.

A natural means for a user to specify a destination location by voice, particularly when the exact name or address of the location is not known or immediately available, is through the use of landmarks. For instance, a user may specify "the Italian restaurant near Main St.", or "the gas station near the ballpark". A dialog system that allows a user to identify locations through the use of landmarks can lead to more succinct user dialogs with the dialog system, greater system accuracy and performance, and smoother device operation, improving a user's experience with and expanding the functionality of such a dialog system.

SUMMARY OF THE INVENTION

A location is recommended to a user based on a received user utterance. The user can speak the utterance, and a landmark navigation system can capture the utterance and convert the utterance into the text. The utterance specifies a location attribute and a landmark. For instance, a user may say "the gas station near the tennis courts". In this instance, the location attribute is "gas station", and the landmark is "tennis courts". The landmark navigation system can be implemented in a vehicle, a mobile phone, a computer, and the like. It should be noted that although the term "location attribute" is used herein, it should be known that the utterance can specify a category, a sub-category, a genre, a chain entity (such as "Subway Restaurant"), a specific entity (such as "Mel's sandwich shop"), description information (such as "the cheap restaurant", or "the small grocery store"), or any other location attribute.

A set of candidate locations is identified based on the specified location attribute. A confidence score can be determined for each identified candidate location, the confidence score representing the likelihood that the candidate location represents the specified location attribute. A set of landmarks is identified based on the specified landmark. Similarly, a confidence score can be determined for each landmark representing the likelihood that the landmark represents the specified landmark. The set of candidate locations and the set of landmarks can be identified at least in part through semantic belief tracking over one or more dialog turns.

A kernel is generated for each landmark in the set of landmarks. The kernel model is a three-dimensional model with a base co-planar with a map, and centered at the location of the landmark on the map. The shape of kernel model base can be based on the type of landmark, the shape of the landmark on the map, or any other characteristics of the landmark. The amplitude of the kernel model can be greatest at the location of the landmark on the map, and can decay according to a Gaussian curve with increased distance from the landmark. The amplitude of the kernel model can also be based on attributes of the associated landmark, the type of the associated landmark, the prevalence of the type of the associated landmark, the confidence score of the associated landmark, the location of the user, relative language included in the utterance (such as "North of", "two blocks from", and the like), or any other characteristic of the associated landmark or user.

The candidate locations are ranked based on the kernel models. The amplitude of each kernel model at the location of each candidate location on the map can be determined and summed for each candidate location to produce a kernel model amplitude sum for the candidate location. The candidate locations can then be ranked based on the kernel model amplitude sums. The kernel model amplitude sums can be modified based on confidence scores associated with each candidate location. A candidate location can be selected based on the candidate location rankings, and can be presented to the user, for instance by audio or by display.

The features and advantages described in the specification are not all inclusive and, in particular, many additional features and advantages will be apparent to one of ordinary skill in the art in view of the drawings and specification. Moreover, it should be noted that the language used in the specification has been principally selected for readability and instructional purposes, and may not have been selected to delineate or circumscribe the inventive subject matter.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Overview

Figure 1A:
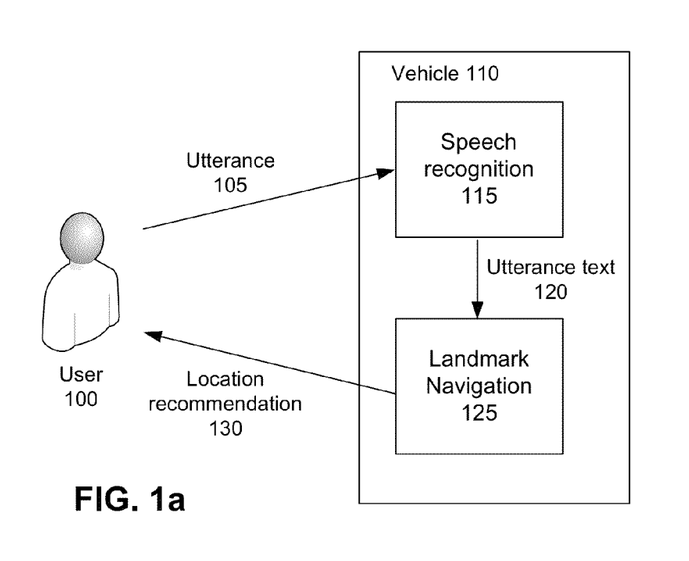
FIG. 1a illustrates a vehicle-based voice-activated navigation system for implementing a landmark-based location belief tracking dialog system in accordance with one embodiment.

FIG. 1a illustrates a vehicle-based voice-activated navigation system for implementing a landmark-based location belief tracking dialog system in accordance with one embodiment. In the embodiment of FIG. 1a, a user 100 operates a vehicle 110 that implements a landmark-based location belief tracking dialog system (hereinafter, "landmark navigation system"). The vehicle 110 includes a speech recognition module 115 and a landmark navigation system 125. It should be noted that in other embodiments, the landmark navigation system can be implemented in environments other than a vehicle, for instance, in a mobile phone, a computer, and the like, though the reminder of the description herein will focus on vehicle implementations for the purposes of simplicity. While the vehicle 110 may be configured to allow the user 100 to interact with the vehicle by speaking in other ways, the remainder of the description herein will be limited to embodiments in which the user interacts with the vehicle's landmark-based location services.

The user 100 speaks an utterance 105 that is received by the speech recognition module 115. The utterance can be a sentence, a phrase, a command, a few words, a request, a query, a clarification, or any other suitable speech. The utterance generally includes an identification of a location attribute and a landmark, as will be discussed below. The utterance can be received over several speaking turns by the user, for instance in response to a prompt by the vehicle 110 to clarify an utterance. The speech recognition module 115 includes a microphone or other speech capturing device, and can capture the utterance either automatically (for instance, upon detecting the utterance), or in response to a manual input by the user.

The speech recognition module 115 converts the captured utterance 105 to utterance text 120, for instance by identifying words within the captured utterance and determining text representative of the identified words. In one embodiment, the speech recognition module outputs one or more text hypotheses for a captured utterance, and outputs a confidence score associated with each text hypothesis representing the confidence of the speech recognition module that the text hypothesis accurately represents the utterance. The speech recognition module can implement any suitable speech recognition technology configured to perform the speech-to-text conversion operations described herein. For example, automatic speech recognition ("ASR") can be used to produce a set of text hypotheses ranked according to confidence, and natural language understanding ("NLU") can be used to classify portions of each of a top threshold number or percent of text hypotheses as "location attribute text" and "landmark text", as described below.

The speech recognition module 115 can classify portions of utterance text as location attribute text or landmark text, or as both, based on the content of the utterance text. In a first example of utterance text, "restaurants on first", "restaurants on first" can be classified as location attribute text and "first" can be classified as landmark text. In a second example, "restaurants near first", "restaurants" can be classified as location attribute text, while "near first" is classified as landmark text. In one embodiment, the utterance 105 includes a plurality of location attributes and landmarks. The principles described herein apply equally to such an embodiment, though the remainder of the description will be limited to instances where the utterance specifies one location attribute and one landmark for the purposes of simplicity.

The landmark navigation system 125 receives the utterance text 120, and outputs a location recommendation 130 based on the utterance text to the user 100. The utterance 105 can be a request for directions, a search query, a phone number or directory request, a request for reviews, and the like. Accordingly, the location recommendation can be directions, navigation instructions, search query results, a phone number, an address, a review, and the like.

Figure 1B:
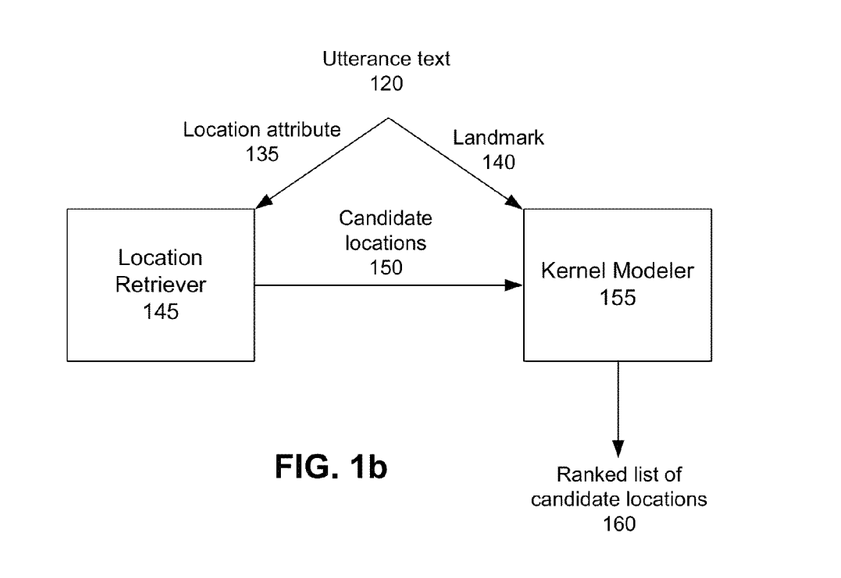
FIG. 1b illustrates an overview of a process for landmark navigation in accordance with one embodiment.

FIG. 1b illustrates an overview of a process for landmark navigation in accordance with one embodiment. In one embodiment, the landmark navigation process of FIG. 1b is performed by the landmark navigation system 125 of FIG. 1a. The utterance text 120 includes location attribute text 135 and landmark text 140. The location attribute can be a genre (such as "parks", "restaurants", "gyms", etc.), a sub-genre (such as "dog parks", "Italian restaurants", "basketball gyms", etc.), or can specify a particular entity (e.g., "Ben's Italian Restaurant"). The landmark can be a specific named place (such as monuments, parks, businesses, restaurants, buildings, etc.), a non-specific named place (such as neighborhoods, districts, cities and towns, etc.), a non-place location (such as streets, rivers, etc.), or any other suitable location. The landmark text can also include relative text, specifying a location relative to the landmark. For example, a user can specify "around the Acme Gas Station", "two blocks from Hyde Park", "North of $7^{th}$ St.", and the like. The location attribute text and landmark text can include a plurality of location attribute hypotheses and landmark hypotheses, respectively, each associated with a confidence score representing the likelihood that a particular location attribute hypothesis or landmark hypothesis accurately reflects a user-intended location attribute or landmark.

A location retriever 145 receives the location attribute 135 and, as described below, produces a set of candidate locations 150 associated with the location attribute. A kernel modeler 155 receives the landmark 140 and the candidate locations 150, and, as described below, ranks the candidate locations based on the received landmark text to produce a ranked list of candidate locations 160. The landmark navigation system 125 can select a location from among the ranked candidate locations (for instance, the highest ranking candidate location), and can output a location recommendation 130 to the user 100 based on the selected candidate location. Alternatively, the landmark navigation system can select a top threshold number of ranked candidate locations, and can present the selected candidate locations to the user, allowing the user to select a presented candidate location. The landmark navigation system is detailed in FIG. 2.

Figure 2:
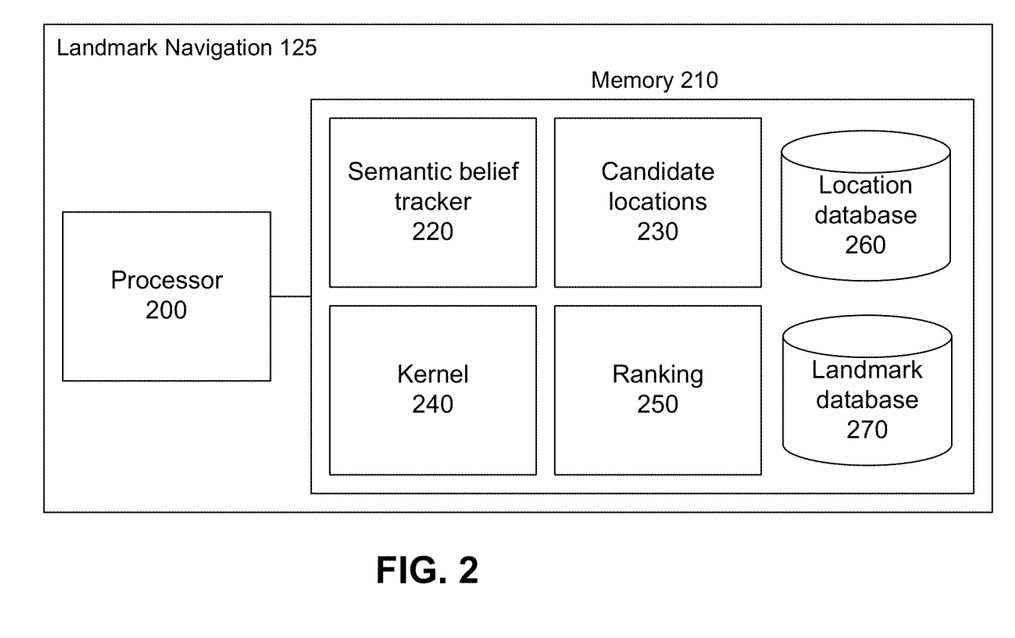
FIG. 2 illustrates a landmark navigation system for implementing a landmark-based location belief tracking dialog system in accordance with one embodiment.

FIG. 2 illustrates a landmark navigation system for implementing a landmark-based location belief tracking dialog system in accordance with one embodiment. The landmark navigation system 125 includes a processor 200 and a memory 210. Note that in other embodiments, the landmark navigation system can include other components than those illustrated in FIG. 2.

The processor 200 processes data signals and may include various computing architectures including a complex instruction set computer ("CISC") architecture, a reduced instruction set computer ("RISC") architecture, or an architecture implementing a combination of instruction sets. Although only a single processor is shown in FIG. 2, multiple processors may be included. The processor may include arithmetic logic units, microprocessors, general purpose computers, or some other information appliances equipped to transmit, receive and process electronic data signals from and between the memory 210 and any other component or system, both within and external to the vehicle 110.

The memory 210 stores instructions and/or data that can be executed by the processor 200. The instructions and/or data may comprise code (i.e., modules) for performing any and/or all of the techniques described herein. The memory may be any non-transitory computer-readable storage medium such as dynamic random access memory ('DRAM') device, a static random access memory ("SRAM") device, Flash RAM (non-volatile storage), combinations of the above, or some other memory device known in the art.

In the embodiment of FIG. 2, the memory 210 includes a semantic belief tracker module 220, a candidate locations module 230, a kernel module 240, and a ranking module 250. The memory also includes a location database 260 and a landmark database 270, though it should be noted that both the location database and the landmark database can be located in other memories, or can be located external to the vehicle 110 (for instance, in an online database accessible to the vehicle). In other embodiments, the memory can include additional, fewer, or different modules to perform the functionalities described herein. The modules stored within the memory are communicatively coupled to each other and to the processor 200.

The semantic belief tracker 220 receives location attribute text 135 from the speech recognition module 115 and produces a set of joint-inferred user goals ("JIUGs") based on the utterance text. Each JIUG is a location attribute hypothesis, and can include a confidence score associated with the location attribute hypothesis representing a confidence of the semantic belief tracker module that location attribute hypothesis is representative of the user utterance 105 or the utterance text 120. For example, if a user says "Italian on first near the ballpark", the semantic belief tracker can receive the location attribute text "Italian on first", and can produce the following JIUGs with associated confidence scores:

Italian restaurants on First Street, confidence score: 0.7
Italian restaurants on First Avenue, confidence score: 0.5
Italian marketplace on First Street, confidence score 0.3
Indian restaurants on First Street, confidence score 0.1

To generate JIUGs from location attribute text, the semantic belief tracker 220 can employ belief tracking using a dynamic probabilistic ontology tree ("DPOT"). A DPOT is a Bayesian Network composed of a tree-shaped subnetwork representing the static user goal (the user-desired location attribute), connected to a series of subnetworks representing evidence gathered from successive dialog turns. Semantic belief tracking in general, and DPOTs in particular are described in greater detail in U.S. patent application Ser. No. 13/221,155, titled "Belief tracking and action selection in spoken dialog systems", filed Aug. 30, 2011, the contents of which are incorporated by reference herein in their entirety. In other embodiments, the semantic belief tracker can produce location attribute hypotheses in other ways, though the remainder of the description will be limited to the production of JIUGs using a DPOT for the purpose of simplicity.

The semantic belief tracker 220 can generate JIUGs according to a pre-determined format. The JIUG format can include one or more attributes, such as "genre", "sub-genre", "name", "location", "sub-location", "price range", "review rating", and the like. The semantic belief tracker can populate as many of the attributes as possible for each JIUG based on the location attribute text. For example, for the location attribute text "dog parks in Houston", the genre attribute ("park"), the sub-genre attribute ("dog park"), and the location attribute ("Houston") of the JIUG are populated; the name attribute and the sub-location attribute are not populated; and the price range attribute and review rating attribute are determined not to be applicable. The semantic belief tracker can attempt to populate as many JIUG format attributes as possible based on the location attribute text, and prompt the user 100 for additional information to populate additional attributes if needed. In one embodiment, the JIUG format is based on a format of locations stored at the location database 260.

In one embodiment, the location attribute text 135 received by the semantic belief tracker 220 includes a plurality of location attribute hypotheses, each associated with a confidence score. The semantic belief tracker can produce one or more JIUGs for each location attribute hypothesis, or can produce one or more JIUGs based on a set of received location attribute hypotheses. The confidence scores produced by the semantic belief tracker and associated with each JIUG can be based on confidence scores associated with received location attribute hypotheses, based on a user history of the user 100 (e.g., based on locations visited by the user in the past, landmark navigation system user history for the user, and so forth), based on global user history for other users, based on a number of dialog turns on which the location attribute text is based, based on a location attribute type associated with the location attribute text, and the like.

The candidate locations module 230 receives the set of JIUGs from the semantic belief tracker 220 and produces a set of candidate locations based on the set of JIUGs. The candidate locations module requests candidate locations from the location database 260. The location database stores a set of locations, and can store one or more location attributes associated with each location. As described above, the format of each stored location and associated location attributes can be the same as the format of the received JIUGs. The location database can be populated by external location data sources, such as encyclopedia websites, review websites, map database, business directories, and the like.

The candidate location module 230 can query the location database 260 with all received JIUGs, with a threshold number or percentage of JIUGs associated with the highest confidence scores, with any JIUGs with an above-threshold confidence score, or with any other selection of JIUGs. The location database, in response to being queried with a JIUG, can access and output one or more locations and associated confidence scores associated with the JIUG. For example, for a JIUG of "Supermarket in San Jose", the location database can identify locations associated with the JIUG (such as all supermarkets in the San Jose area), can determine a confidence score that each identified location is associated with the JIUG, and can provide all or a threshold number of the identified locations to the candidate location module. The confidence scores for each identified location can be based on the confidence score of the JIUG used to query the locations database, the number of attributes in common between the JIUG and the identified location, the number of common words or other lexical or semantic features between the JIUG and the identified location, the number of identified locations, and the like.

Continuing with the "Italian on first near the ballpark" utterance example above, the candidate location module 230 may query the location database 260 with, for example, the 3 JIUGs with the highest confidence score, or "Italian restaurants on First Street", "Italian restaurants on First Avenue", and "Italian marketplace on First Street". The candidate location module can request the two locations associated with each HUG associated with the highest confidence score. In response, the candidate location module may return the following locations:

"A's Italian restaurant on First Street", confidence score: 0.9

"B's Italian ice cream on First Street", confidence score: 0.3

"C's Italian restaurant on First Avenue", confidence score: 0.8

"D's Italian restaurant on Ninth Avenue", confidence score: 0.1

"E's Italian grocery stored on First Street", confidence score: 0.5

In this example, the location database 260 returned "A's . . . " and "B's . . . " in response to being queried with "Italian restaurants on First Street", "C's . . . " and "D's . . . " in response to being queried with "Italian restaurants on First Avenue", and "E's . . . " in response to being queried with "Italian marketplace on First Street". The location database may have identified more than two locations for the first two queries, but only outputted the two queries with the highest confidence scores. In one embodiment, the location database may only output identified locations if the locations are associated with a confidence score that exceeds a threshold. In other embodiments, the location database may output all identified locations to the candidate location module 230, which in turn may select the most applicable locations, the locations associated with the highest confidence scores, etc.

The candidate locations module 230 compiles the locations received from the location database 260, and forms a set of candidate locations. The set of candidate locations can include all locations received from the location database, or can include only the locations associated with an above-threshold confidence score, a threshold number or percentage of locations associated with the highest confidence scores, and the like. The candidate locations module can perform a pre-ranking of the set of candidate locations based on confidence score, or based on any other location attribute.

The kernel module 240 receives the landmark text 140, and generates a kernel model for one or more landmarks associated with the landmark text. The kernel module queries the landmark database 270 with the landmark text to identify a set of landmarks associated with the landmark text. The landmark database stores landmarks and attributes of the landmarks, such as the location of the landmark (for instance, the longitude and latitude of the landmark, the location of the landmark on a map, etc.), characteristics of the landmark (the type of the landmark, the name of the landmark, etc.), or any other characteristic of the landmarks. The landmark database can be populated by external landmark sources, such as encyclopedia websites, review websites, map databases, business directories, and the like. In one embodiment, the location database 260 and the landmark database are part of the same database.

The landmark database 270, in response to being queried with the landmark text 140, identifies a set of landmarks associated with the landmark text. In one embodiment, the landmark database identifies a set of landmarks by identifying stored landmarks with attributes associated with text similar to the landmark text. The landmark database can also assign a confidence score to each identified landmark based on the strength of match between the landmark text and the identified landmark, based on a popularity or ratings associated with each landmark, based on a proximity of the landmark to the user 100, or based on any other characteristic associated with the landmark or the user. For example, if the location database is queried with the landmark text "Phil's Sandwiches", the location database can identify the following landmarks with the associated confidence scores:

Phil's Sandwich Shop #1, confidence score: 0.95

Phil's Sandwich Shop #2, confidence score: 0.90

Phil's Laundromat, confidence score: 0.40

Bill's Sandwiches, confidence score: 0.65

The set of identified landmarks provided by the landmark database 270 in response to being queried can include all identified landmarks, a threshold number or percentage of identified landmarks associated with the highest confidence scores, all identified landmarks with threshold scores exceeding a threshold, or any other set of identified landmarks.

The kernel module 240 generates a kernel model for each landmark in the set of identified landmarks received from the landmark database 270. A kernel model is a 3-dimensional model rendered on a map, centered at the location of the landmark associated with the kernel. In one embodiment, the base of the kernel model is co-planar with the map. As will be discussed below in greater detail, the shape of the base of a kernel model can depend on a landmark's attributes (for instance, the landmark type, location, etc.), and the height of a kernel model (hereinafter "amplitude") can depend on a confidence score associated with an identified landmark, based on attributes of a landmark, based on the size or prominence of the landmark, based on relative text associated with the landmark text, and the like.

Figure 3:
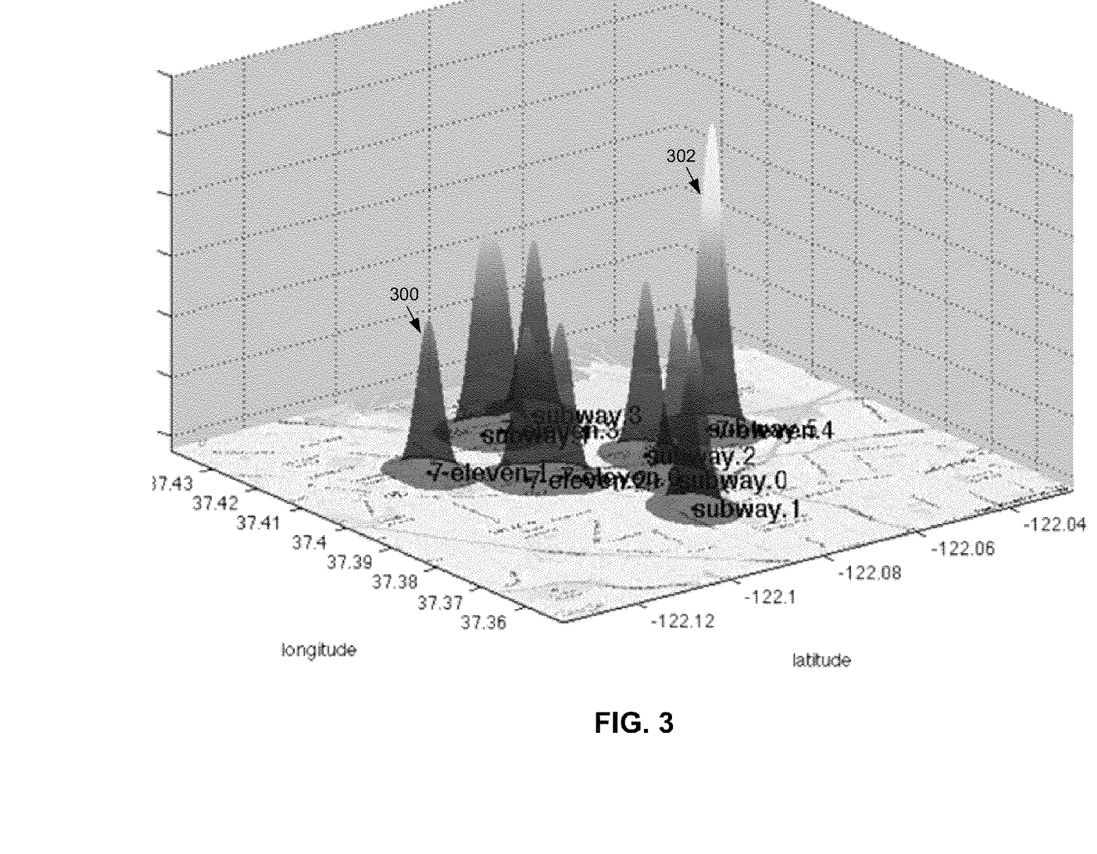
FIG. 3 illustrates example kernel models generated on a map in accordance with one embodiment.

FIG. 3 illustrates example kernel models generated on a map in accordance with one embodiment. In the embodiment of FIG. 3, the location database 270 returns a set of identified landmarks including several "7-eleven" stores and "Subway" restaurants. The kernel module 240 generates a kernel for each of the set of landmarks. For instance, a first kernel model 300 is generated for a first landmark (a 7-eleven store), and a second kernel model 302 is generated for a second landmark (a Subway restaurant). The base of each kernel model in the embodiment of FIG. 3 is circular and extends along the x- and y-axis of the map. The amplitude of each kernel model protrudes from the map along the z-axis of the map, is greatest centered at the location of the landmark, and decays according to a Gaussian curve based on the map distance from the landmark. In the embodiment of FIG. 3, kernel model 302 has a greater amplitude than kernel model 300, for example because of a greater confidence score associated with the landmark associated with kernel model 302, because of a greater popularity of the landmark associated with kernel model 302, or because of a closer proximity of the user 100 to the landmark associated with kernel model 302.

As described above, the shape of a kernel model generated by the kernel module 240 can be based on the shape of the associated landmark on the map, the type of the landmark, the prominence of the landmark, and the like. In addition to the circular-based Gaussian kernel models illustrated in FIG. 3, kernel model bases can represent the shape of a landmark on the map. In one embodiment, a rectangular city park is represented by a rectangular-based kernel model. In this embodiment, the kernel model amplitude within the park on the map may be constant for all points within the rectangular area representing the park on a map, with the model amplitude decreasing with an increase in the distance to the closest point of the rectangular area representing the park on the map. The shape of the base for each kernel may represent an augmented shape of the landmark on a map, may represent a pre-determined shape, or may represent a most important portion of the shape of a landmark on a map. Landmarks may include roads; in such instances, the shape of the kernel model may encompass the shape of the road on the map, and may decrease in amplitude with increasing distance from the road.

The shape of the kernel model base for an associated landmark may be based on the type of landmark. Base shapes may be pre-determined for each landmark type. For example, restaurants may be represented by circle-based kernel models, parks may be represented by rectangular-based kernel models, and roads may be represented by line-based kernel models. Alternatively, base shapes may be customized for particular landmarks. For example, a polygonal-based kernel model may be generated to represent a geographic region landmark such as a downtown area for a town.

Kernel model bases and amplitudes can be based on the prominence or importance of the landmark type. For example, the amplitude and radius of a point-based kernel model can be greater for a national landmark than for a national-chain fast food restaurant. Likewise, the amplitude of a square-based kernel for a landmark may decrease slower for school landmarks than for gas station landmarks as the distance from the kernel model increases.

The amplitude of a kernel model can be based on a confidence score associated with an identified landmark provided by the landmark database 270. For example, the amplitude of a kernel model generated for a landmark with a confidence score of 0.9 can be greater than the amplitude of a kernel model generated for a landmark with a confidence score of 0.4. In one embodiment, the kernel module 240 only generates kernel models for landmarks associated with an above-threshold confidence score.

The amplitude of a kernel model can be based on the prevalence of the type of landmark represented by the kernel model. For example, if a landmark is determined to be a French restaurant, and it is determined that several French restaurants are located near the user 100, the amplitude of the kernel model corresponding to each French restaurant may be decreased. Kernel model amplitudes can be based on other properties or attributes of the landmark, for instance, the number of people that have "checked in" to the landmark, based on the prices of goods or services associated with the landmark, or based on any other property of the landmark.

The amplitude of a kernel model may be based on the amount of use of the landmark represented by the kernel model across multiple users of landmark navigation systems. The local landmark navigation systems of many users may communicate to a central landmark navigation system configured to aggregate the use of particular landmarks across multiple users. In response to receiving a landmark from a user at a local landmark navigation system, the local landmark navigation system may query the central landmark navigation system to determine how often the landmark is used. If a landmark is commonly used, the amplitude of the kernel model representing the landmark at the local landmark navigation system may be greater than if the landmark is not commonly used.

The amplitude of a kernel model may be based on external data describing or associated with the landmark represented by the kernel model. For example, a third-party user review database may be queried for a landmark, and the amplitude of the kernel model representing the landmark may be based on the number of reviews associated with the landmark, based on a user-rating associated with the landmark (such as an aggregate rating by users on a 1-10 scale), or based on any other information associated with the landmark.

Non-specific landmarks may also be provided by users, and kernel models representing the non-specific landmarks can be generated. For example, the user 100 may provide the landmark "downtown", and the user's local system may not be able to immediately determine the boundaries of a downtown region. In such embodiments, the kernel module 240 can estimate the location of the non-specific landmark, can query an external data source to determine the boundaries of the non-specific landmark, and/or can prompt the user for additional detail.

As noted above, the landmark text 140 can include relative text specifying a location relative to the landmarks. Kernel models can be generated based on such relative text. For example, the user 100 may say "The city park north of $7^{th}$ Avenue". Accordingly, the amplitude of kernel models associated with landmarks north of the street $7^{th}$ Avenue may be greater on average than the amplitude of kernel models associated with landmarks south of $7^{th}$ Avenue. The user may indicate a landmark on the user's side of the street, for instance "The gas station on my side of the street". The amplitude of kernel models associated with landmarks on the user's side of the street can be greater on average than the amplitude of kernel models associated with landmarks on the other side of the street. Similarly, the user may indicate a direction relative to the user, such as "the grocery store south of here", and the amplitude of kernel models associated with landmarks south of the user can be greater on average than the amplitude of kernel models associated with landmarks that are not south of the user.

The amplitude of a kernel model associated with a landmark can be based on whether the user 100 has previously provided the landmark to the landmark navigation system 125. For instance, the amplitude of kernel models associated with landmarks that have been previously provided by the user can be greater on average than the amplitude of kernel models associated with landmarks that have not been previously provided by the user. In addition, the amplitude of a kernel model associated with a landmark can be based on whether or not a user has previously provided the landmark and then subsequently indicated the landmark was useful or not useful in using the landmark navigation system.

It should be noted that a negative kernel model may be generated to model negative landmark text limitations. A negative kernel is a kernel model with a negative amplitude (an amplitude that projects downward from a map, as opposed to regular kernel models that project upward from the map, such as the kernel models of FIG. 3). For example, when a user says "the taco stand, but not the taco stand near the train station", a negative kernel model can be generated for landmarks associated with "train station."

As described above, the landmark navigation system 125 can be implemented in a vehicle 110. Accordingly, the landmark navigation system might be used while the vehicle is in motion. In such embodiments, the amplitudes of kernel models can change dynamically as the vehicle moves. For instance, when the user 100 requests "the nearest restaurant", the amplitudes of the kernel models representing restaurants near the vehicle can be increased relative to the kernel models of restaurants further away from the vehicle. As the vehicle continues to move and as restaurants that were previously near the vehicle become further away from the vehicle, the amplitudes of the kernel modes for such restaurants can be subsequently reduced, and the amplitudes of the kernel modes for restaurants that become nearer to the vehicle can be increased.

The vehicle 110 may be equipped with motion detectors capable of capturing gestures such as pointing. In such vehicles, the amplitudes of generated kernel models representing landmarks can be based on the gestures of the user 100. For example, if a user points in a particular direction and says "restaurants in this direction", the amplitudes of kernel models of landmarks in the pointed direction can be greater on average than the amplitudes of kernel models that are not in the pointed direction. Similarly, vehicles may employ gaze-tracking techniques that can be used to generate kernel models for landmarks in the direction of a user's gaze with a greater amplitude on average than the amplitude of kernel models that are not in the direction of the user's gaze.

The ranking module 250 receives the set of candidate locations from the candidate locations module 230 and receives the generated kernel models from the kernel module 240, and ranks the candidate locations based on the amplitudes of the generated kernel models at each candidate location. For each candidate location, the ranking module identifies the location of the candidate location on the map, and identifies all kernel models that overlap the candidate location on the map. The ranking module then sums the amplitude of each overlapping kernel model at the candidate location on the map to determine a kernel model amplitude sum for the candidate location, and ranks the candidate locations based at least in part on the kernel model amplitude sums.

Figure 4:
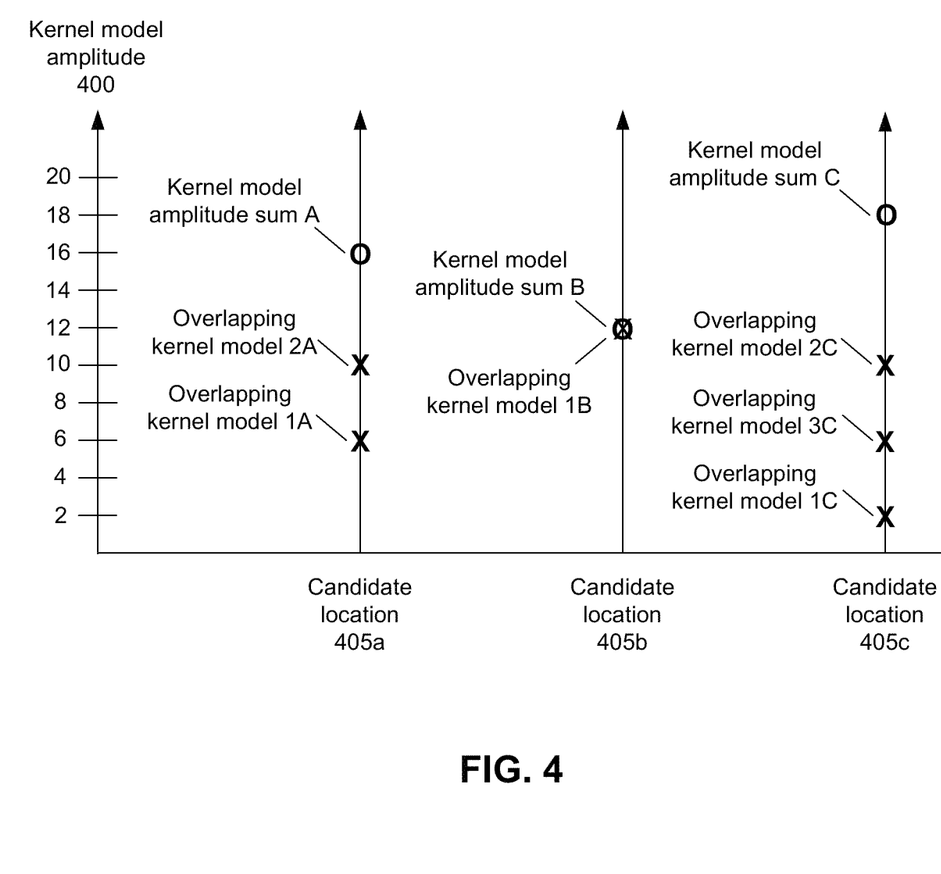
FIG. 4 illustrates kernel model amplitude sums for example candidate locations in accordance with one embodiment.

FIG. 4 illustrates kernel model amplitude sums for example candidate locations in accordance with one embodiment. In the embodiment of FIG. 4, the y-axis represents kernel model amplitude 400; the amplitude units in the graph of FIG. 4 are arbitrary. Overlapping kernel models are identified for each of three candidate locations (405a, 405b, and 405c). For candidate location 405a, two kernel models (1A and 2A) overlap with candidate location 405a. The amplitudes of kernel models 1A and 2A at candidate location 405a are 6 and 10, respectively. Accordingly, the kernel model amplitude sum A for candidate location 405a is 16.

One kernel model (1B) overlaps with the candidate location 405b, with an amplitude of 12 at the candidate location 405b. Since only one kernel model overlaps with the candidate location 405b, the kernel model amplitude sum B for the candidate location 405b is also 12. Three kernel models (1C, 2C, and 3C) overlap with the candidate location 405c. At the candidate location 405c, kernel model 1C has an amplitude of 2, kernel model 2C has an amplitude of 10, and kernel model 3C has an amplitude of 6, for a kernel model amplitude sum C of 18.

The ranking module 250 ranks the candidate locations based on the kernel model amplitude sums associated with each candidate location. In the embodiment of FIG. 4, the ranking module ranks candidate location 405c first, candidate location 405a second, and candidate location 405b third. The ranking module can rank the candidate locations based additionally on the confidence scores associated with each candidate location. For example, the ranking module can multiply the kernel model amplitude sum of each candidate location by the confidence score associated with the candidate location to produce a modified kernel model amplitude sum for each candidate location. Continuing with the example embodiment of FIG. 4, the confidence scores associated with candidate locations 405a, 405b, and 405c can be 0.5, 0.75, and 0.33, respectively. The ranking module can then determine modified kernel model amplitude sums (determined by multiplying each kernel model amplitude sum by an associated candidate location confidence score) for the candidate locations as follows:

Candidate location 405a: (16)*(0.5)=8
Candidate location 405b: (12)*(0.75)=9
Candidate location 405c: (18)*(0.33)=6

In this example, the ranking module ranks candidate location 405b highest and candidate location 405c lowest.

In some embodiments, one or more kernel models with negative amplitudes overlap with a candidate location. In such embodiments, summing the amplitudes of the kernel models that overlap with the candidate location involves subtracting the magnitudes of the amplitudes of the kernel models with negative amplitudes from the sum of the amplitudes of the kernel models with positive amplitudes.

The ranking module 250 outputs a ranked list of candidate locations for use by the landmark navigation system 125 in selecting a location to recommend to the user 100. The ranked list of candidate locations can include kernel model amplitude sums or modified kernel model amplitude sums associated with each candidate location. The landmark navigation system can select the top ranked candidate location, or a number of top ranked candidate locations for presenting to the user, for instance by speaking or displaying the selected candidate locations to the user.

It should be noted that in some embodiments, the speech recognition module 115 can be implemented in a mobile communications device ("MCD") or in an entity external the vehicle 110 configured to communicate with the vehicle 110. The MCD can be, for example, a mobile phone, a navigation system, or a tablet computer. The external entity can be, for example, a remote server or cloud-based computing system. An MCD and/or an external entity can be configured to communicate with the vehicle 110, for instance, over a wireless communicative interface implementing a wireless protocol, such as Bluetooth, WiFi, or a 2G/3G/4G cellular network. In one embodiment, the speech recognition module 115 is implemented within the MCD, which is configured to capture a signal representing an utterance, communicate the signal to a speech-to-text conversion server external to the vehicle, and receive a signal representing the utterance text for communication to the landmark navigation system 125. In other embodiments, one or more of the components of the landmark navigation system 125 are implemented in a MCD or an external entity. For example, the semantic belief tracker 220 and the candidate locations module 230 can be implemented in an MCD, and the location database 260 and landmark data 270 can be implemented in an external database. In such an embodiment, the MCD can directly query the external database wirelessly for locations and landmarks, or can provide JIUGs to the landmark navigation system 125, which in turn queries the external database for locations and landmarks.

In some embodiments, the functionality of the landmark navigation module 125 is implemented within a search engine interface. For example, a user 100 can interact with a search engine (either implemented within or external to a vehicle 110) by speaking an utterance specifying a location attribute and a landmark. In response, the search engine can identify a set of candidate locations and a set of landmarks based on the utterance, can generate a kernel model for each landmark, and can rank the candidate locations based on amplitudes of the kernel models. The search engine can then provide the ranked candidate locations as search results within the search engine interface.

Figure 5:
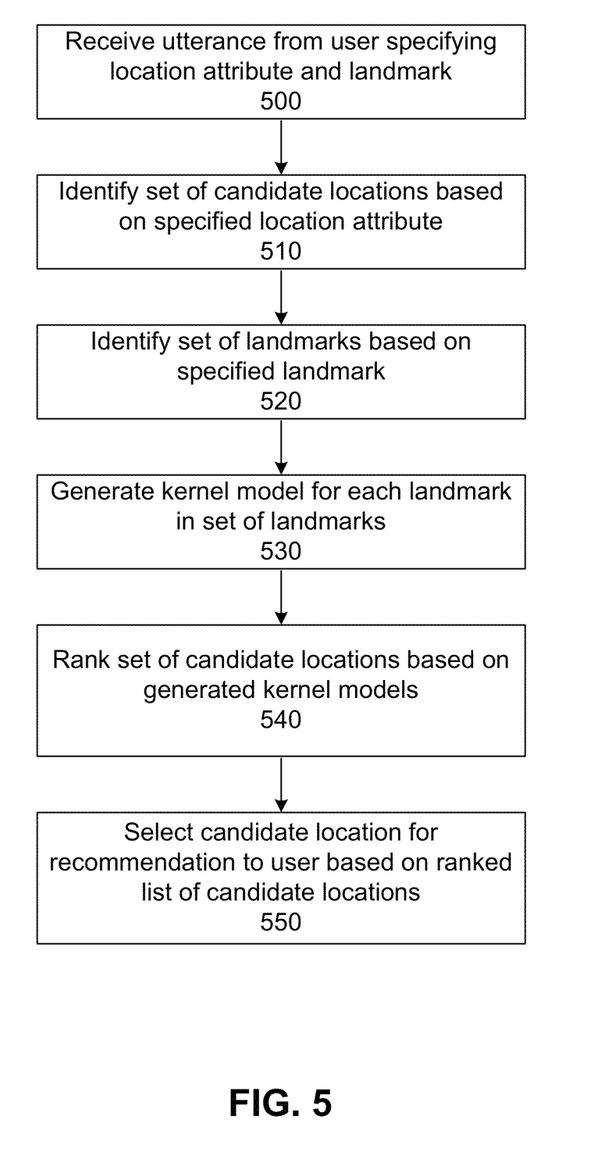
FIG. 5 illustrates a process of selecting a location for recommendation to a user in accordance with one embodiment.

FIG. 5 illustrates a process of selecting a location for recommendation to a user in accordance with one embodiment. An utterance is received 500 from a user specifying a location attribute and a landmark. For example, the user of a vehicle's landmark navigation system may say "the park near downtown" or "the steakhouse north of Washington street" with the intent of receiving navigation directions or business information from the landmark navigation system.

A set of candidate locations is identified 510 based on the specified location attribute. The candidate locations can be identified from locations stored in a location database, for instance by querying the location database for candidate locations that include text associated with the specified location attribute. A confidence score can be generated for each identified candidate location representing the likelihood that the identified candidate location represents the specified location attribute. A set of landmarks associated with the specified landmark is identified 520, for instance by querying a landmark database for landmarks that include text associated with the specified landmark. A confidence score can be generated for each identified landmark representing the likelihood that the identified landmark represents the specified landmark.

A kernel model is generated 530 for each landmark in the set of landmarks. As described above, a kernel model can be a 3-dimensional model with a base shape co-planar with a map and centered on the landmark's location on the map, and with an amplitude protruding from the map and based on attributes of the landmark, a confidence score associated with the landmark, the location of the landmark to the user, or any other characteristic of the landmark.

The set of candidate locations is ranked 540 based on the generated kernel models associated with the set of landmarks. For each candidate location, the amplitudes of all kernel models overlapping the candidate location at the candidate location are summed. The kernel model amplitude sums can be modified, for instance by multiplying each sum by a confidence score associated with each candidate location. The candidate locations are then ranked by the kernel model amplitude sums, and one or more candidate locations are selected 550 for recommendation to a user based on the ranked list of candidate locations. For instance, if a user requests "Mexican restaurants by the Empire State Building", several Mexican restaurants may be identified as candidate locations, a kernel model can be generated for the Empire State Building and other landmarks, and the Mexican restaurant associated with the highest kernel model amplitude sum can be selected for recommendation to the user.

Additional Considerations

Reference in the specification to "one embodiment" or to "an embodiment" means that a particular feature, structure, or characteristic described in connection with the embodiments is included in at least one embodiment. The appearances of the phrase "in one embodiment" or "an embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations or transformation of physical quantities or representations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device (such as a specific computing machine), that manipulates and transforms data represented as physical (electronic) quantities within the computer system memories or registers or other such information storage, transmission or display devices.

Certain aspects include process steps and instructions described herein in the form of an algorithm. It should be noted that the process steps and instructions could be embodied in software, firmware or hardware, and when embodied in software, could be downloaded to reside on and be operated from different platforms used by a variety of operating systems. The embodiment can also be in a computer program product which can be executed on a computing system.

The exemplary embodiments also relate to an apparatus for performing the operations herein. This apparatus may be specially constructed for the purposes, e.g., a specific computer in a vehicle, or it may comprise a general-purpose computer selectively activated or reconfigured by a computer program stored in the computer which can be in a vehicle. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Memory can include any of the above and/or other devices that can store information/data/programs. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the method steps. The structure for a variety of these systems will appear from the description below. In addition, the exemplary embodiments are not described with reference to any particular programming language. It will be appreciated that a variety of programming languages may be used to implement the teachings as described herein, and any references below to specific languages are provided for disclosure of enablement and best mode.

In addition, the language used in the specification has been principally selected for readability and instructional purposes, and may not have been selected to delineate or circumscribe the inventive subject matter. Accordingly, the disclosure is intended to be illustrative, but not limiting, of the scope of the embodiments.

While particular embodiments and applications have been illustrated and described herein, it is to be understood that the embodiment is not limited to the precise construction and components disclosed herein and that various modifications, changes, and variations may be made in the arrangement, operation, and details of the methods and apparatuses without departing from the spirit and scope.

What is claimed is:

1. A computer-based method of determining a location, comprising:
   receiving a signal representing an utterance from the user, the utterance specifying a location attribute and a landmark;

identifying a set of candidate locations based on the specified location attribute;

identifying a set of landmarks based on the specified landmark;

generating an associated kernel model for each landmark in the set of landmarks, each kernel model comprising a three-dimensional model centered on a map at the location of a landmark associated with the kernel model;

ranking the candidate locations based on kernel model amplitudes at each candidate location, wherein at least one candidate location is associated with multiple kernel models, and wherein the at least one candidate location is ranked based on a sum of the amplitudes of the multiple kernel models at the at least one candidate location; and selecting a location to provide to the user based on the ranked candidate locations.

2. The method of claim 1, wherein the signal representing the utterance is converted to text comprising location attribute text representing the specified location attribute and landmark text representing the specified landmark.

3. The method of claim 1, wherein identifying a set of candidate locations comprises performing semantic belief tracking to identify candidate locations representative of the specified location attribute.

4. The method of claim 3, wherein semantic belief tracking is performed over a plurality of dialog turns.

5. The method of claim 1, further comprising determining an associated confidence score for each candidate location representing the likelihood that the candidate location represents the specified location attribute.

6. The method of claim 1, further comprising determining an associated confidence score for each landmark representing the likelihood that the landmark represents the specified landmark.

7. The method of claim 1, wherein at least one kernel model has a circular base, wherein the amplitude of the kernel model is greatest at the location on the map of the associated landmark, and wherein the amplitude of the kernel model decays with an increase in distance from the location of the associated landmark according to a Gaussian curve.

8. The method of claim 1, wherein the shape of at least one kernel model base is based on a type of the landmark associated with the kernel model.

9. The method of claim 1, wherein the shape of at least one kernel model base is based on a shape of the aerial boundary of the landmark associated with the kernel model on the map.

10. The method of claim 1, wherein the amplitude of at least one kernel model is based on a confidence score of the landmark associated with the kernel model.

11. The method of claim 1, wherein the amplitude of at least one kernel model is based on one or more attributes of the landmark associated with the kernel model.

12. The method of claim 11, wherein the amplitude of the kernel model is based on a landmark type of the associated landmark.

13. The method of claim 12, wherein the amplitude of the kernel model is based on a prevalence of the landmark type.

14. The method of claim 11, wherein the amplitude of the kernel model is based on reviews associated with the associated landmark.

15. The method of claim 1, wherein the received signal representing the utterance further specifies a direction, and wherein the amplitude of at least kernel model is based on the specified direction.

16. The method of claim 1, wherein the signal representing the utterance is received by a search engine at a search engine user interface, and further comprising:

providing the ranked candidate locations to the user as search results via the search engine user interface.

17. The method of claim 1, further comprising:

multiplying the sum of the kernel model amplitudes by a confidence score of the at least one candidate location to form a modified kernel model amplitude sum; and ranking the at least one candidate location based on the modified kernel model amplitude sum.

18. The method of claim 1, wherein selecting a candidate location comprises selecting the highest ranked candidate location.

19. A system for determining a location for recommendation to a user, comprising:

a non-transitory computer readable storage medium comprising executable computer modules configured to:

receive a signal representing an utterance from the user, the utterance specifying a location attribute and a landmark;

identify a set of candidate locations based on the specified location attribute;

identify a set of landmarks based on the specified landmark;

generate an associated kernel model for each landmark in the set of landmarks, each kernel model comprising a three-dimensional model centered on a map at the location of a landmark associated with the kernel model;

rank the candidate locations based on kernel model amplitudes at each candidate location, wherein at least one candidate location is associated with multiple kernel models, and wherein the at least one candidate location is ranked based on a sum of the amplitudes of the multiple kernel models at the at least one candidate location; and select a location to provide to the user based on the ranked candidate locations; and a processor configured to execute the computer modules.

20. The system of claim 19, wherein the executable computer modules are further configured to:

convert the signal representing an utterance to text comprising location attribute text representing the specified location attribute and landmark text representing the specified landmark.

21. The system of claim 19, wherein identifying a set of candidate locations comprises performing semantic belief tracking to identify candidate locations representative of the specified location attribute.

22. The system of claim 19, wherein the executable computer modules are further configured to:

determine at least one of: an associated confidence score for each candidate location representing the likelihood that the candidate location represents the specified location attribute, and an associated confidence score for each landmark representing the likelihood that the landmark represents the specified landmark.

23. The system of claim 19, wherein at least one kernel model has a circular base, wherein the amplitude of the kernel model is greatest at the location on the map of the associated landmark, and wherein the amplitude of the kernel model decays with an increase in distance from the location of the associated landmark according to a Gaussian curve.

24. The system of claim 19, wherein the shape of at least one kernel model base is based on at least one of: a type of the landmark associated with the kernel model, and a shape of the aerial boundary of the landmark associated with the kernel model on the map.

25. The system of claim 19, wherein the amplitude of at least one kernel model is based on at least one of: a confidence score of the landmark associated with the kernel model, one or more attributes of the landmark associated with the kernel model,
    a landmark type of the associated landmark, and reviews associated with the associated landmark.

26. The system of claim 19, wherein the received signal representing the utterance further specifies a direction, and wherein the amplitude of at least kernel model is based on the specified direction.

27. The system of claim 19, further comprising:
    multiplying the sum of the kernel model amplitudes by a confidence score of the at least one candidate location to form a modified kernel model amplitude sum; and
    ranking the at least one candidate location based on the modified kernel model amplitude sum.

28. The system of claim 19, wherein selecting a candidate location comprises selecting the highest ranked candidate location.

* * * * *